US 12,528,256 B2

United States Patent
Backes et al.

(10) Patent No.: US 12,528,256 B2
(45) Date of Patent: Jan. 20, 2026

(54) SEALING DEVICE AND METHOD FOR SEALING EQUIPMENT ELEMENTS TO WORKPIECES BY MEANS OF ULTRASOUND

(71) Applicant: SIG Services AG, Neuhausen am Rheinfall (CH)

(72) Inventors: Martin Backes, Heinsberg (DE); Sven Hagen, Jüchen (DE); Paul Kromm, Niederzier (DE)

(73) Assignee: SIG Services AG, Neuhausen am Rheinfall (CH)

( * ) Notice: Subject to any disclaimer, the term of this patent is extended or adjusted under 35 U.S.C. 154(b) by 0 days.

(21) Appl. No.: 18/698,801

(22) PCT Filed: Sep. 26, 2022

(86) PCT No.: PCT/EP2022/076666
§ 371 (c)(1),
(2) Date: Apr. 5, 2024

(87) PCT Pub. No.: WO2023/057248
PCT Pub. Date: Apr. 13, 2023

(65) Prior Publication Data
US 2024/0326346 A1    Oct. 3, 2024

(30) Foreign Application Priority Data

Oct. 8, 2021   (DE) .................. 10 2021 126 177.5

(51) Int. Cl.
*B32B 41/00*      (2006.01)
*B29C 65/08*      (2006.01)
*B29C 65/78*      (2006.01)

(52) U.S. Cl.
CPC .......... *B29C 65/08* (2013.01); *B29C 65/7841* (2013.01)

(58) Field of Classification Search
CPC ........................... B29C 65/08; B29C 65/7841
(Continued)

(56) References Cited

U.S. PATENT DOCUMENTS

| 4,527,727 A | 7/1985 | Renshaw |
| 6,085,489 A | 7/2000 | Bachner et al. |

(Continued)

FOREIGN PATENT DOCUMENTS

| CN | 87102204 A | 9/1987 |
| CN | 1531477 A | 9/2004 |

(Continued)

*Primary Examiner* — Michael N Orlando
*Assistant Examiner* — Joshel Rivera
(74) *Attorney, Agent, or Firm* — The Webb Law Firm

(57) ABSTRACT

A sealing device for sealing equipment elements to workpieces, in particular in the form of a composite laminate, by means of ultrasound, with a sonotrode for generating an ultrasound, with a sealing surface for transmitting the ultrasound to the equipment element and/or the workpiece, with an anvil opposite the sonotrode and with an adjusting device for adjusting the sonotrode. The anvil relative to one another from an open position for at least partial inserting of the equipment element. The workpiece into a sealing gap between the sonotrode and the anvil into a closed position for at least partially pressing the workpiece. The equipment element between the sealing surface of the sonotrode and the anvil during ultrasonic sealing and back. In order to prevent damage and leakiness in workpieces such as packaging laminates, for example in the area of crease lines, by sealing equipment elements such as spouts to the workpieces or the packaging laminates by means of ultrasound, it is provided that at least one pair of mutually corresponding clamping means vibration-decoupled from the sealing surface is provided on opposite sides of the sealing gap for clamping the workpiece in the closed position. At least one pair of (Continued)

clamping means are provided outside the sealing surface as viewed in a direction along the sealing gap relative to the equipment element.

20 Claims, 6 Drawing Sheets

(58) Field of Classification Search
USPC .................... 156/60, 64, 350, 351, 378, 379
See application file for complete search history.

(56) References Cited

U.S. PATENT DOCUMENTS

| | | |
|---|---|---|
| 9,751,257 B2 | 9/2017 | Li et al. |
| 11,597,553 B2 | 3/2023 | Mancin et al. |
| 2013/0299558 A1 | 11/2013 | Lang et al. |

FOREIGN PATENT DOCUMENTS

| | | |
|---|---|---|
| CN | 105263695 A | 1/2016 |
| DE | 102005047706 A1 | 4/2007 |
| DE | 102010000968 A1 | 7/2011 |
| DE | 102015109457 A1 | 12/2015 |
| JP | S59206185 A | 11/1984 |
| JP | S61121928 A | 6/1986 |
| JP | 2004255580 A | 9/2004 |
| JP | 2014184981 A | 10/2014 |
| JP | 2019514799 A | 6/2019 |
| WO | 2010081639 A1 | 7/2010 |
| WO | 2018163072 A1 | 9/2018 |
| WO | 2020163694 A1 | 8/2020 |

SEALING DEVICE AND METHOD FOR SEALING EQUIPMENT ELEMENTS TO WORKPIECES BY MEANS OF ULTRASOUND

CROSS-REFERENCE TO RELATED APPLICATIONS

This application is the United States national phase of International Patent Application No. PCT/EP2022/076666 filed Sep. 26, 2022, and claims priority to German Patent Application No. 10 2021 126 177.5 filed Oct. 8, 2021, the disclosures of which are hereby incorporated by reference in their entireties.

BACKGROUND OF THE INVENTION

Field of the Invention

The invention relates to a sealing device for sealing equipment elements to workpieces, in particular in the form of a composite laminate, by means of ultrasound, with a sonotrode for generating an ultrasound, with a sealing surface for transmitting the ultrasound to the equipment element and/or the workpiece, with an anvil opposite the sonotrode and with an adjusting device for adjusting the sonotrode and the anvil relative to one another from an open position for at least partially inserting the equipment element and the workpiece into a sealing gap between the sonotrode and the anvil into a closed position for in each case at least partially pressing the workpiece and the equipment element between the sealing surface of the sonotrode and the anvil during ultrasonic sealing and back. Furthermore, the invention relates to a method for sealing equipment elements to workpieces, in particular in the form of a composite laminate, by means of ultrasound.

Description of Related Art

Workpieces can be designed in the form of packaging laminates. The packaging laminates are used to form packagings for holding different products to be filled. The products are usually a foodstuff, in particular a beverage, which may have chunky components as required. In principle, the products are pourable or free-flowing, in particular flowable. Packagings for holding a food product with at least one liquid component are particularly preferred. The packagings are typically designed as so-called composite packagings, which are generally formed from a packaging laminate, in particular a cardboard/plastic-composite laminate, with a planar layer structure.

Cardboard composite packagings and cardboard/plastic-composite laminates for the production of such packagings have a cardboard layer that gives the packaging its basic stability and therefore its basic structure. The cardboard layer thus forms the structure-giving carrier layer, which at least significantly determines the bending stiffness of the packaging laminate, but in particular provides it to a large extent. In other words, the packaging laminate and the packaging produced from it retain their shape due to the structure-giving carrier layer. In addition, outer, in particular thermoplastic, plastic layers, for example made of polyethylene (PE), are usually provided. The plastic layers protect the cardboard from moisture and the food from absorbing undesirable substances from the packaging. Additional layers, such as an aluminum layer, can also be provided to prevent the diffusion of oxygen and other gases through the packaging laminate. Furthermore, outer thermoplastic layers allow the packaging laminate to be sealed to close the packagings and to attach equipment elements such as spouts to the packagings. Packaging laminates are also usually printed with a decoration that can be printed on an outer plastic layer, whereby the decoration is typically much thinner than the actual outer plastic layer. The packaging laminate can also include other layers, such as an aluminum layer, which provides a barrier effect against gases and light.

The packaging laminate can be provided as web material or continuous material, in particular as roll material, from which packaging can be formed directly without first producing a blank. The roll material is first bent over and formed into a tube along its longitudinal edges by sealing and closed in a liquid-tight manner in the longitudinal direction. Liquid-tight transverse seams are then sealed at regular intervals. Product can then be filled into the tube pockets that are open at the top before the tube pockets are closed by the next transverse seams to form packagings.

Alternatively, the packaging laminate can be cut in the longitudinal direction and/or transverse direction before the packaging is formed, producing so-called blanks. These can be further processed into so-called packaging sleeve blanks in the form of packaging jackets or packaging sleeves. For this purpose, the longitudinal edges are placed on top of each other and sealed together to form a longitudinal sealing seam. This results in tubular packaging sleeves, which are folded flat and stacked for further processing at another location, in particular in a filling machine. A formed and filled packaging can then be produced from the packaging sleeves in the filling machines.

The flat-folded packaging sleeves can be transferred as a stack to a magazine of the filling machine and unfolded one after the other. Unfolding takes place along pre-folded fold lines, along which the packaging laminate can be easily creased or folded. Corresponding fold lines are also known as crease lines. The correspondingly unfolded packaging sleeve is then folded at one end, pressed and sealed, i.e. closed. The closed end of the packaging sleeve can later form the bottom or the top of the packaging. The packaging bodies created in this way, which are open on one side, are fed into a filling machine, where the packaging bodies are preheated with hot sterile air and then sterilized, typically with hydrogen peroxide, and dried with sterile air. The sterile packaging bodies are then filled, after which the opening of the filled packaging bodies is closed before the corresponding packaging leaves the filling machine.

To ensure that the packaging material blank can be folded reliably, quickly and easily to form a packaging sleeve, a bottom of the packaging body and the top of the packaging, the packaging material web is provided with crease lines along which the packaging material blanks can be folded. The crease lines are typically embossed into the packaging material web using creasing tools, with the packaging material web having a depression along the crease lines on one side of the packaging material web and an elevation on the opposite side of the packaging material web.

A particularly large number of crease lines are provided in the top and bottom areas of the packagings, as these are required for folding the top and bottom of the packagings. In addition to the crease lines, in many cases an equipment element in the form of a spout is attached to the top area of the packaging, through which the contents of the packaging can later be poured out. The spouts typically have a bottom body for passing the product through and a flange for connecting the spout to a thermoplastic layer of the packaging laminate. A lid can also be provided, which is screwed onto the bottom body to close the spout. A hole is usually provided in the packaging laminate onto which the spout is applied from the later inside or later outside of the packaging. The hole can be coated with another material in order to close the hole in the packaging laminate, for example with a film that can be easily opened if necessary.

The spout is typically attached by placing the flange of the spout around the hole and then ultrasonically welding it to the adjacent thermoplastic layer of the packaging laminate. For this purpose, the packaging laminate and the spout are pressed between an ultrasound generating sonotrode and an anvil as a counterpart and partially heated by the ultrasound so that the flange and/or the adjacent layer of the packaging laminate is melted or at least softened. As a result of the pressure applied to the packaging laminate and the spout, the spout and the packaging laminate are welded together. However, this repeatedly results in damage to adjacent crease lines. Here the packaging laminate can burst, leak and/or delaminate.

Similar problems can also arise when sealing other equipment elements to packaging laminates, for example when sealing lids, cutlery, straws, giveaways and the like. However, corresponding problems can also occur when sealing equipment elements to other workpieces. The workpieces are preferably at least partially planar workpieces, which can be in the form of a laminate. It is advisable if at least some sections of the surface are made of a thermoplastic material. In addition, the aforementioned problems occur in particular if there is a discontinuity in the workpiece adjacent to the sealing location, which stands in the way of the unhindered transmission of vibrations and/or heat.

SUMMARY OF THE INVENTION

Therefore, the present invention is based on the object of designing and further developing the sealing device and the method of the type mentioned at the beginning and explained in more detail above in such a way that damage to and leakiness in workpieces such as packaging laminates, for example in the area of crease lines, due to sealing of equipment elements such as spouts to the workpieces or of the packaging laminates by means of ultrasound can be avoided.

This object is solved in a sealing device as described herein in that at least one pair of mutually corresponding clamping means, which are vibration-decoupled with respect to the sealing surface, is provided on opposite sides of the sealing gap for clamping the workpiece in the closed position, and in that the at least one pair of clamping means is provided outside the sealing surface with respect to the equipment element, in particular the spout, as viewed in a direction along the sealing gap.

The said object is further solved as described herein by a method for sealing equipment elements to workpieces, in particular in the form of a composite laminate, by means of ultrasound, as described herein, in which the equipment element and the workpiece are each at least partially inserted into a sealing gap between a sonotrode and an anvil and pressed there between the sonotrode and the anvil, in which the pressed workpiece is clamped between at least one pair of mutually corresponding clamping means from opposite sides of the sealing gap with respect to the equipment element outside the sealing surface, and in which, when the workpiece is clamped, a sealing surface of the sonotrode, which is vibration-decoupled with respect to the at least one pair of clamping means, transmits ultrasound to the pressed equipment element and/or the pressed workpiece, thereby sealing the equipment element and the workpiece together.

According to the invention, therefore, not only the workpiece, in particular in the form of a packaging laminate, and the equipment element, in particular in the form of a spout, are pressed between the sonotrode and the anvil in order to seal the equipment element to the workpiece. The workpiece is also clamped between clamping means arranged on opposite sides of the sealing gap and thus on opposite sides of the workpiece held in the sealing gap. With the sonotrode and the anvil in the closed position, the clamping means can also be moved together to clamp the workpiece while the workpiece is being sealed with the equipment element. The clamping means are vibration-decoupled from the sonotrode so that no ultrasound is transmitted to the workpiece to any significant extent via the clamping means, unlike via the sealing surface of the sonotrode.

In addition, the clamping means are provided outside the area to be sealed relative to the equipment element. This does not necessarily mean that the clamping means clamp the workpiece outside the flange of the equipment element. It can also be provided that the clamping means clamp the workpiece together with the flange of the equipment element, namely outside the area to be sealed or at least outside the contact surface between the workpiece and/or equipment element on the one hand and the sealing surface of the sonotrode on the other. Outside the sealing surface means that the clamping means with its clamping surface in contact with the workpiece is not arranged on the side of the sealing surface facing a central area of the equipment element, but on the opposite side of the sealing surface.

From a procedural point of view, this is implemented in that firstly the equipment element and the workpiece are each at least partially inserted into a sealing gap between a sonotrode and an anvil and are pressed there between the sonotrode and the anvil. At least during the ultrasonic sealing of the workpiece and the equipment element, the pressed workpiece is clamped between at least one pair of mutually corresponding clamping means from opposite sides of the sealing gap, namely at a point outside the sealing surface of the sonotrode relative to the equipment element. The sonotrode, which is vibration-decoupled from the clamping means, can then seal the workpiece pressed between the sonotrode and the anvil with the equipment element, which is also pressed between the sonotrode and the anvil. This is done by the sealing surface of the sonotrode transmitting ultrasonic vibrations to the pressed workpiece and/or the pressed equipment element.

Ultrasound is ultimately used to introduce the energy required for sealing locally into the workpiece and/or the equipment element. However, this corresponding energy is not only available in the area of the sealing seam, but also radiates into other areas of the workpiece, even if the energy density in the workpiece decreases with increasing distance from the sealing surface of the sonotrode due to dissipation. However, the conduction of energy in the workpiece is specifically terminated or at least greatly weakened by the clamping of the workpiece. The energy cannot or not easily pass through the clamping area.

The energy spreads in particular via heat conduction and via the conduction of ultrasonic vibrations through the workpiece. In the area where the workpiece is clamped, the conduction of ultrasonic vibrations is hindered, as the clamped area cannot vibrate or can only vibrate to a limited extent due to the clamping. The clamped area of the workpiece therefore represents an obstacle to the vibration of the workpiece. In addition, the clamping means can absorb a considerable amount of the heat conducted by the workpiece. This means that only a much smaller part of the heat is conducted away from the clamped area of the workpiece. The heat conduction is therefore not blocked by the clamping itself. Heat is also conducted away from the clamped area of the workpiece. However, a considerable part of the heat conducted into the clamping area is removed from the workpiece through contact with the clamping means.

Clamping the workpiece therefore prevents such a high energy density from being conducted to an adjacent crease line of the workpiece, for example. The crease line also represents an obstacle to the propagation of the ultrasonic vibrations in the workpiece, as the workpiece is more compact and stiffer in the area of the crease line, which is why the workpiece conducts the vibrations in the area of the crease line significantly less well than in the adjacent area of the workpiece. The vibrations reaching the crease line would therefore be either partially absorbed or partially reflected by the crease line, which would lead directly to mechanical stress on the crease line and indirectly to heat generation at the crease line. In addition to this heat development, there is also heat that is transported to the crease line via heat conduction. All of this, individually or together, can lead to damage to the crease line, which could result in leaks, bursting and delamination of the workpiece if the clamping means were not used as described.

The processes described above for a crease line can also occur on other discontinuities of a workpiece. Such discontinuities can be kinks, beads, tapers, openings, holes, joints and the like. These elements can also represent an obstacle to the unhindered propagation of ultrasonic vibrations and/or the temperature in the workpiece. If necessary, the workpiece can also be a composite laminate. With these workpieces, undesired delamination, i.e. separation of individual layers of the laminate, can possibly be prevented according to the invention.

In principle, a clamping force of the at least one pair of mutually corresponding clamping means, which can be between 10 N and 150 N for typical applications, has proven itself. However, clamping forces between 25 N and 100 N or between 45 N and 70 N can be particularly preferred.

For the sake of clarity and to avoid unnecessary repetition, the sealing device and the method are described together below, without distinguishing in detail between the sealing device and the method. However, it is clear to the person skilled in the art from the context which features are particularly preferred for the sealing device and the method in each case.

In a first particularly preferred embodiment of the sealing device, the equipment element is designed as a spout and/or the workpiece is designed as a packaging laminate, in particular in the form of a cardboard/plastic-composite laminate. In these cases, the advantages of the sealing device are utilized to a particularly high degree, as the workpiece could otherwise be damaged particularly easily. A spout can also be used without a packaging laminate and vice versa. The advantages are also particularly evident when a workpiece in the form of a cardboard/plastic-composite laminate is used. These have a particular tendency to delaminate. Such workpieces are also often first joined with crease lines and then with a equipment element in order to produce a cardboard composite packaging. This means that attaching the equipment element can lead to a detrimental impairment of the crease lines. Corresponding workpieces, in particular cardboard/plastic-composite laminates, have a cardboard layer, which is intended to provide the basic stability and thus the basic structure of the packaging as a structure-giving carrier layer. In addition, outer thermoplastic layers, for example made of polyethylene (PE), are preferably provided in order to be able to seal the workpieces and to protect the cardboard from moisture. Additional layers, such as an aluminum layer, can also be provided to prevent the diffusion of oxygen and other gases through the workpiece. The workpieces can also be printed with a decoration or the like on at least one side.

Alternatively or additionally, the at least one pair of clamping means can be provided at least substantially circumferentially around the sealing surface relative to the sealing gap. In this way, the sealing energy introduced by the sealing surface of the sonotrode in the area of the equipment element cannot or not to any significant extent spread outwards in all directions. For the sake of simplicity and to avoid stress peaks in the workpiece, it may also be advisable for the at least one pair of clamping means to be provided at least substantially annularly around the sealing surface.

For example, at least two pairs of mutually corresponding clamping means can also be provided on opposite sides of the sealing gap for clamping the workpiece in the closed position. This is useful in the event that crease lines are only provided adjacent to the equipment element in certain directions. The spread of the energy introduced during sealing only needs to be limited in these directions. The same can also be the case if the workpiece has a fiber-containing layer, in particular a layer of cardboard, with a preferred fiber direction, which can also be referred to as the main fiber direction. In this case, the vibrations introduced into the workpiece are preferably conducted in the main fiber direction. This means that the propagation of the energy introduced during sealing only needs to be limited in this main fiber direction, if necessary to both sides starting from the central area of the equipment element. The at least one further pair of clamping means are also vibration-decoupled from the sealing surface. The clamping means should not transmit any significant additional vibrations to the workpiece. Irrespective of this, it is particularly useful if the at least two pairs of clamping means are provided on opposite sides outside the sealing surface relative to the equipment element and viewed in a direction along the sealing gap. In this way, the excessive propagation of the sealing energy in the workpiece in opposite directions can be impeded.

If at least one clamping means of the at least one pair of clamping means has an elastic section, further vibration decoupling from the sonotrode can take place. The vibrations from the sonotrode are then absorbed at least to a considerable extent by the elastic material and thus removed from the system. Alternatively or additionally, a more reliable clamping of the workpiece can be achieved if required. The elastic section of the clamping means can then help to compensate for unevenness of the workpiece in the clamping area. The workpiece can therefore be clamped evenly and at the same time adequately. It is particularly simple and practical if the elastic section provides the clamping surface of the at least one clamping means for clamping the workpiece. Alternatively, the clamping surface should preferably be connected to other sections of the clamping means exclusively via the elastic section. The elastic section of the clamping means can also remove at least some part of the vibration energy from the workpiece. The vibrations of the workpiece cause the elastic section to vibrate, which converts these vibrations into heat as a result of internal friction. The corresponding heat can then be transmitted to the environment or other sections of the clamping means. It is generally a good idea for the elastic section to be made of a material with a low Young's modulus. The Young's modulus of the material should preferably be less than 5.0 N/mm$^2$, preferably less than 2.5 N/mm$^2$, in particular less than 1.0 N/mm$^2$. Alternatively, the elastic section can have a hardness of between 20 and 100 Shore, in particular between 40 and 80 Shore. Appropriate vibration damping behavior was achieved with these hardnesses.

For the sake of simplicity, at least one clamping means of the at least one pair of clamping means associated with the anvil can be designed as part of the anvil. This is particularly the case if the corresponding clamping means has an elastic section. Additional vibration decoupling can then be achieved. However, vibrations are usually transmitted to the anvil via the equipment element and/or the workpiece by the sealing itself. Additional vibration decoupling of the at least one clamping means associated with the anvil can therefore usually be achieved if this clamping means is designed at a distance from the anvil in a direction at least substantially parallel to the sealing gap. Consequently, no vibrations can be transmitted via this distance, in particular if air or the like is provided between the anvil and the clamping means. Irrespective of this, it can also be useful here if the corresponding clamping means has an elastic section. Vibration decoupling can then be achieved at least relative to the workpiece. The vibration decoupling then simultaneously leads to a welcome vibration damping in the area of the clamping of the workpiece.

Vibration decoupling that is as comprehensive as possible can also be of particular importance in relation to the sonotrode. Therefore, it may be useful if at least one clamping means of the at least one pair of clamping means associated with the sonotrode is spaced apart from the sonotrode in a direction at least substantially parallel to the sealing gap. Consequently, no vibrations can be transmitted via this distance, in particular if air or the like is provided between the anvil and the clamping means.

Alternatively or additionally, a vibration damper in the form of a solid component with increased inertia can also be used to dampen vibrations. This is possible by fixing at least one clamping means of the at least one pair of clamping means to a vibration damper with a mass of between 50 g and 400 g, preferably between 80 g and 300 g, in particular between 125 g and 225 g. This can be at least one clamping means associated with the anvil and/or at least one clamping means associated with the sonotrode. However, the latter can be particularly useful, as the ultrasonic waves are generated by the sonotrode and are also transmitted from the sonotrode to the workpiece and/or the equipment element. So that the vibrations can be damped via the vibration damper primarily via inertia, it may be advisable for the vibration damper to be made of a material with a Young's modulus of at least 50,000 N/mm$^2$, preferably at least 100,000 N/mm$^2$, in particular at least 150,000 N/mm$^2$.

Irrespective of this, it may be useful for uniform vibration damping to provide at least one clamping means of the at least one pair of clamping means on a vibration damper provided at least substantially annularly around the sonotrode and/or the sealing surface. Here too, the at least one clamping means can be associated with the anvil and/or the sonotrode. Since the ultrasonic waves are generated by the sonotrode as described and are transmitted from the sealing surface of the sonotrode to the workpiece and/or the equipment element, it can also be particularly useful here if the corresponding clamping means is associated with the sonotrode.

In order to achieve the best possible clamping of the workpiece, also taking into account possible tolerances or other deviations, it may be advisable if at least one clamping means is provided adjustable, preferably pivotable or tiltable. This is particularly useful if at least one clamping means of the at least one pair of clamping means is provided so that it can pivot about at least one pivot axis aligned at least substantially parallel to the sealing gap relative to the sonotrode and/or the anvil. This ensures good contact between the clamping means and the workpiece. This can also be achieved particularly reliably if the clamping means is provided so that it can pivot freely about the pivot axis. Since the sonotrode generates the vibrations, the corresponding clamping means can preferably be associated with the sonotrode. Alternatively or additionally, it is particularly preferable in terms of vibration damping if the clamping means is provided together with the vibration damper to be pivotable about the at least one pivot axis.

In order to ensure reliable and appropriate clamping, at least one clamping means of the at least one pair of clamping means can be spring-loaded at least substantially in the direction of the sealing gap. This ultimately allows the clamping force to be predetermined or adjusted to a certain extent. For the sake of simplicity, it is appropriate for the clamping means to be spring-loaded together with the vibration damper. In this case, too, particularly good results can be achieved if the clamping means is associated with the sonotrode causing the vibrations.

In a first particularly preferred embodiment of the method, a spout is used as the equipment element and/or a packaging laminate, in particular in the form of a cardboard/plastic-composite laminate, is used as the workpiece. In these cases, the advantages of the method are utilized to a particularly high degree, as the workpiece could otherwise be damaged particularly easily. A spout can also be used without a packaging laminate and vice versa. The advantages are also particularly evident when a workpiece in the form of a cardboard/plastic-composite laminate is used. These have a particular tendency to delaminate. Such workpieces are also often first joined with crease lines and then with a equipment element in order to produce a cardboard composite packaging. This means that attaching the equipment element can lead to a detrimental impairment of the crease lines. Corresponding workpieces, in particular cardboard/plastic-composite laminates, have a cardboard layer, which is intended to provide the basic stability and thus the basic structure of the packaging as a structure-giving carrier layer. In addition, outer thermoplastic layers, for example made of polyethylene (PE), are preferably provided in order to be able to seal the workpieces and to protect the cardboard from moisture. Additional layers, such as an aluminum layer, can also be provided to prevent the diffusion of oxygen and other gases through the workpiece. The workpieces can also be printed with a decoration or the like on at least one side.

Alternatively or additionally, the workpiece can be clamped by the clamping means of the at least one pair in a longitudinal extension of the clamping means at least predominantly transverse to a main fiber direction of the workpiece. In this way, the conduction of vibrations and heat, which occurs predominantly in the direction of the fibers, is reliably interrupted or at least significantly reduced by the clamping means and the corresponding clamping of the workpiece. This applies in particular if the longitudinal extension of the clamping means is aligned at least substantially perpendicular to the main fiber direction of the workpiece, especially the cardboard. In many cases, it will be the case that not all fibers of a workpiece, in particular a cardboard layer of the workpiece, are aligned parallel to each other. Nevertheless, it will often be the case that most and/or the longest fibers of the workpiece, in particular of a cardboard layer of the workpiece, are aligned at least approximately parallel to one another. This direction is then regarded as the main fiber orientation.

Alternatively or additionally, it is advantageous if the workpiece is clamped by the clamping means between the equipment element and a crease line of the workpiece. This prevents the energy introduced into the workpiece as vibrations and heat during sealing from being conducted unhindered from the workpiece towards the crease line in such a way that damage to the crease line and/or the workpiece can occur. The conduction of the energy is limited at least to a considerable extent by the clamping of the workpiece by means of the clamping means.

Since in many cases crease lines are arranged on opposite sides of the equipment element, particularly when viewed in the main fiber direction, it is advisable for the workpiece to be clamped by the clamping means on opposite sides of the equipment element, particularly when viewed in the main fiber direction. In other directions, for example perpendicular to the main fiber direction, clamping can be omitted in order to protect the workpiece there. This can be useful if crease lines are only provided at some distance in these directions or if the conduction of energy perpendicular to the main fiber direction is so low that the conduction of energy can be accepted without having to fear impairment of the crease lines there.

The spread of the energy introduced into the workpiece during sealing can be limited particularly easily and reliably if the workpiece is clamped at least substantially circumferentially by the clamping means. Spreading in all directions can then be limited. This can be achieved particularly easily and uniformly if the workpiece is clamped at least substantially annularly around the sonotrode and/or the sealing surface.

In order to reduce the vibrations overall and thus remove them from the system, at least one clamping means of the at least one pair of clamping means can have at least one elastic section. This can then be used to at least partially absorb the ultrasonic vibrations during sealing. For this purpose, however, an appropriate contact must be made with the workpiece in order to transmit the vibrations to the elastic section. This is particularly easy to achieve if the elastic section provides a clamping surface of a clamping means. Alternatively, the clamping surface should preferably be connected to other sections of the clamping means exclusively via the elastic section. The vibrations of the workpiece cause the elastic section to vibrate, which converts these vibrations into heat as a result of internal friction. The corresponding heat can then be transmitted to the surroundings or other sections of the clamping means. It is generally a good idea for the elastic section to be made of a material with a low Young's modulus. The Young's modulus of the material should preferably be less than 5.0 N/mm$^2$, preferably less than 2.5 N/mm$^2$, in particular less than 1.0 N/mm$^2$. Alternatively, the elastic section can have a hardness of between 20 and 100 Shore, in particular between 40 and 80 Shore. Appropriate vibration damping behavior was achieved with these hardnesses.

Alternatively or in addition to a corresponding absorption of the vibrations, a damping of the vibrations can also be provided. In the case of absorption, the vibrations are converted into an elastic deformation of the elastic section and the corresponding energy is dissipated in this way. Damping, on the other hand, utilizes the inertia of a sufficient mass of a vibration damper, which must also be brought into contact with the workpiece in such a way that the vibrations can be transmitted from the workpiece to the vibration damper. From a procedural point of view, the vibrations transmitted from the sonotrode to the at least one clamping means of the at least one pair of clamping means can be damped by a vibration damper of a mass between 50 g and 400 g, preferably between 80 g and 300 g, in particular between 125 g and 225 g, supporting the clamping means. This results in sufficient dissipation of energy within the system to protect the neighboring crease lines from this energy. So that the vibrations can be damped via the vibration damper primarily via inertia, it may be advisable for the vibration damper to be made of a material with a Young's modulus of at least 50,000 N/mm$^2$, preferably at least 100,000 N/mm$^2$, in particular at least 150,000 N/mm$^2$.

Alternatively or additionally, it is also expedient if the vibrations transmitted from the sonotrode to the at least one clamping means of the at least one pair of clamping means are damped by a vibration damper supporting the clamping means and circumferentially extending around the sonotrode. This results in an equalization of vibration energy when the vibrations introduced during sealing are transmitted differently in different directions. This equalization is achieved to a particularly high degree if the vibration damper is designed to be at least substantially annular around the sonotrode.

In order to ensure adequate contact between the clamping means and the workpiece, it is advisable for at least one clamping means of the at least one pair of clamping means to be pivoted for clamping about a pivot axis aligned at least substantially parallel to the sealing gap. Inaccuracies of the method or with regard to the workpiece can thus be compensated for, which can contribute to uniform clamping as predetermined. For the sake of simplicity and better damping of the vibrations, the at least one clamping means together with the vibration damper can be pivoted about the pivot axis aligned at least substantially parallel to the sealing gap.

The at least one clamping means of the at least one pair of clamping means can clamp the workpiece at least partially with a clamping force formed at least partially by a restoring force of at least one spring means. This makes it easy to ensure, if necessary, that the workpiece is clamped with sufficient clamping force to prevent the energy introduced into the workpiece during sealing from spreading, whereby the clamping force is also not too great so as not to damage the workpiece during clamping. It is advisable to apply a restoring force to the at least one clamping means together with the vibration damper via the at least one spring means during clamping. This also ensures that the vibrations transmitted from the workpiece to the clamping means are reliably and appropriately transmitted to the vibration damper.

BRIEF DESCRIPTION OF THE DRAWINGS

In the following, the invention is explained with reference to a drawing showing only one embodiment. The drawing shows FIG. 1A-B a sealing device according to the invention in the open position in perspective views, FIG. 2 the anvil of the sealing device from FIG. 1 in a top view, FIG. 3 the sonotrode and a vibration damper of the sealing device from FIG. 1 in top view of and FIG. 4A-C the sealing device of FIG. 1 in the open position and the closed position during the method according to the invention.

DESCRIPTION OF THE INVENTION

Figure 1A:
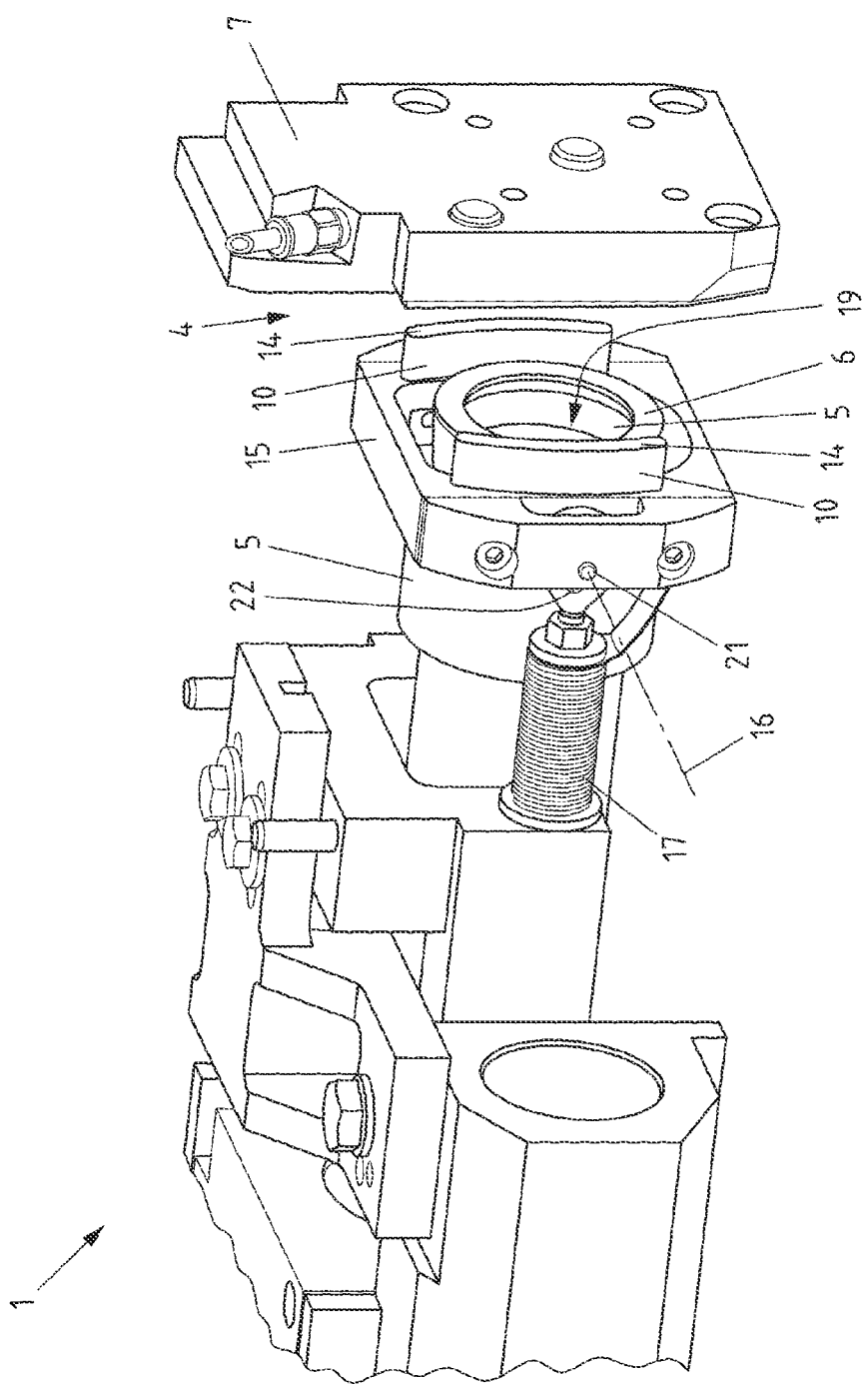
Figure 1B:
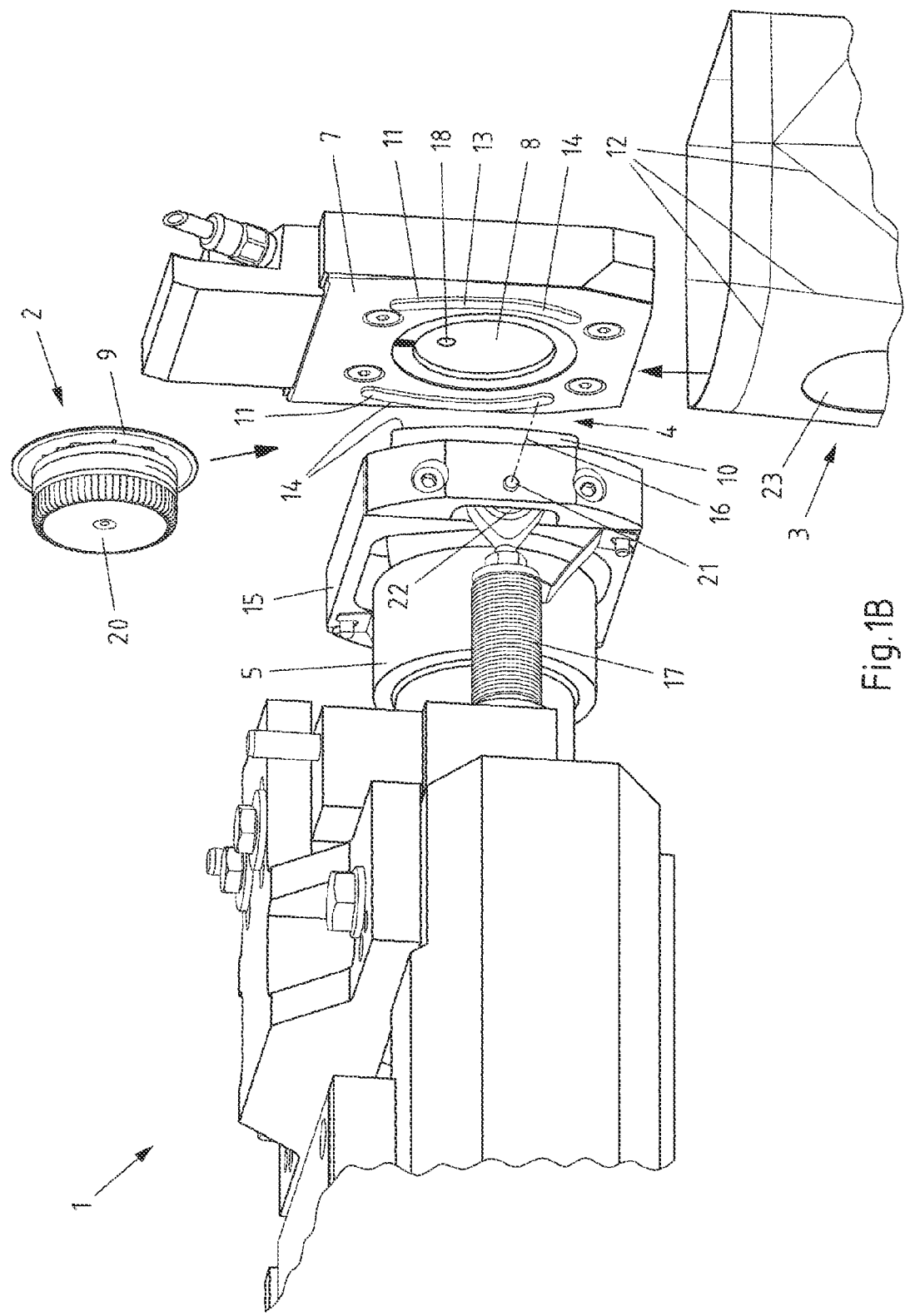

FIGS. 1A-B show a sealing device 1 for sealing equipment elements 2 in the form of spouts to workpieces 3 in the form of a packaging laminate, in particular in the form of a cardboard/plastic-composite laminate, by means of ultrasound. The sealing device 1 provides a sealing gap 4 into which a part of the workpiece 3 and of the packaging element 2 can be inserted. A sonotrode 5 is provided on one side of the sealing gap 4, which sonotrode can generate an ultrasonic vibration and transmit it to the workpiece 3 via the sealing surface 6 of the sonotrode 5. Opposite the sonotrode 5, an anvil 7 is arranged on the other side of the sealing gap 4, which anvil can accommodate a flange 9 of the equipment element 2 in a receptacle 8. The sonotrode 5 then presses the workpiece 3 against this flange 9 and, in the meantime, transmits the ultrasonic vibration to the workpiece 3 in order to seal the workpiece 3 at the corresponding location with the flange 9 of the equipment element 2.

At the same time, the clamping means 10, 11 of two pairs of corresponding clamping means 10, 11 clamp the workpiece 3 between each other in order to prevent the vibrations introduced into the workpiece 3 during sealing and the heat induced in the workpiece 3 as a result from being conducted almost unhindered through the workpiece 3 in the direction of adjacent crease lines 12. The energy of the workpiece 3 generated by the vibrations and the heat could otherwise damage the crease lines 12. For example, the workpiece 3 could burst, leak and/or delaminate in the area of the crease line 12.

In the area of the clamped workpiece 3, heat and vibrations are transmitted from the workpiece 3 to the corresponding clamping means 10, 11 and can therefore not be conducted further outwards from the workpiece 3 to this extent. The clamping means 10, 11 are provided opposite each other on both sides of the sealing gap 4 and are therefore associated to either the anvil 7 or the sonotrode 5. The clamping means 11 associated with the anvil 7 are made of an elastic material, but not necessarily silicone in the present case. This means that the elastic section 13 of the clamping means 11 also forms the clamping surfaces 14 of the respective clamping means 11. This prevents the vibrations from being transmitted unhindered from the workpiece 3 to the anvil 7 or from the anvil 7 to the workpiece 3 via the clamping means 11. The vibrations are partially absorbed by the clamping means 11 and lead to an elastic deformation there, through which the vibration energy is absorbed in the clamping means 11.

In addition, the vibrations transmitted to the anvil 7 by the equipment element 2 during sealing cannot or only to a limited extent be transmitted to the workpiece 3 by the clamping means 11. These vibrations also cause an elastic deformation of the clamping means 11, which are made of an elastic material, and therefore lead to an absorption of the respective energy, which can therefore no longer be transmitted from the anvil 7 to the workpiece 3 via the associated clamping means 11. This ultimately results in vibration decoupling between the anvil 7 and the workpiece 3 via the clamping means 11 associated with the anvil 7.

The clamping means 10 associated with the sonotrode 5 are held by a vibration damper 15, which is arranged at a distance from the sonotrode 5 and thus vibration-decoupled from the sonotrode 5 and the sealing surface 6 of the sonotrode 5. For its part, the vibration damper 15 is held freely pivotable on a pivot axis 16. The pivot axis 16 extends at least substantially parallel to the sealing gap 4. Thus, the clamping surfaces 14 of the clamping means 10 are always aligned parallel to the workpiece 3 in order to clamp the workpiece 3 evenly over the clamping surfaces 14.

The pivot axis 16 and thus the vibration damper 15 can be adjusted in a direction at least substantially perpendicular to the sealing gap 4 relative to the sonotrode 5 and the sealing surface 6 of the sonotrode 5. The vibration damper 15 is spring-loaded in the direction of the sealing gap 4. In other words, the vibration damper 15 can be spaced from the sealing gap 4 against the restoring force of the spring means 17. This limits the maximum clamping force between the pairs of corresponding clamping means 10, 11.

Figure 2:
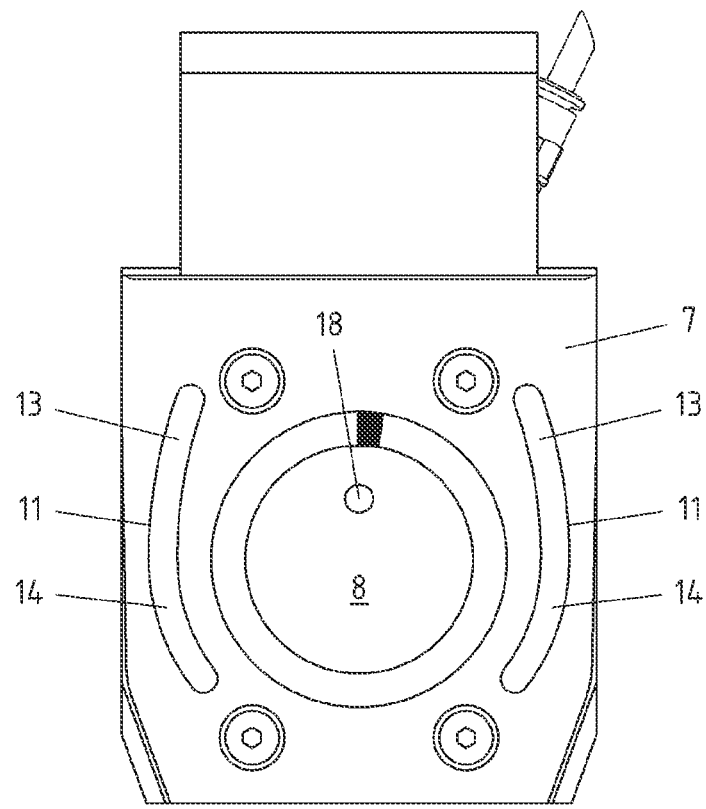

In FIG. 2, the anvil 7 is shown in a top view from the sealing gap 4. The anvil 7 has a receptacle 8 in which the flange 9 of the equipment element 2 can be received. When sealing the equipment element 2 with the workpiece 3, the equipment element 2 is pressed by the sonotrode 5 via the workpiece 3 against the receptacle 8 of the anvil 7. An opening 18 is provided in the receptacle 8 of the anvil 7, through which a vacuum can be drawn in the receptacle 8 in order to hold the equipment element 2 securely in the receptacle 8 of the anvil 7. The clamping means 11 associated with the anvil 7 are arranged on opposite sides of the receptacle 8 and at a distance from the receptacle 8. The clamping means 11 protrude slightly into the sealing gap 4 relative to the receptacle 8. However, since the clamping means 11 are formed from an elastic material, the clamping means 11 can be slightly compressed, for example to such an extent that the clamping means 11 then no longer protrude or no longer protrude so far from the receptacle 8. The clamping surfaces 14 of the clamping means 11 can then be aligned with the receptacle 8 of the anvil 7 and/or with the flange 9 of the equipment element 2.

Figure 3:
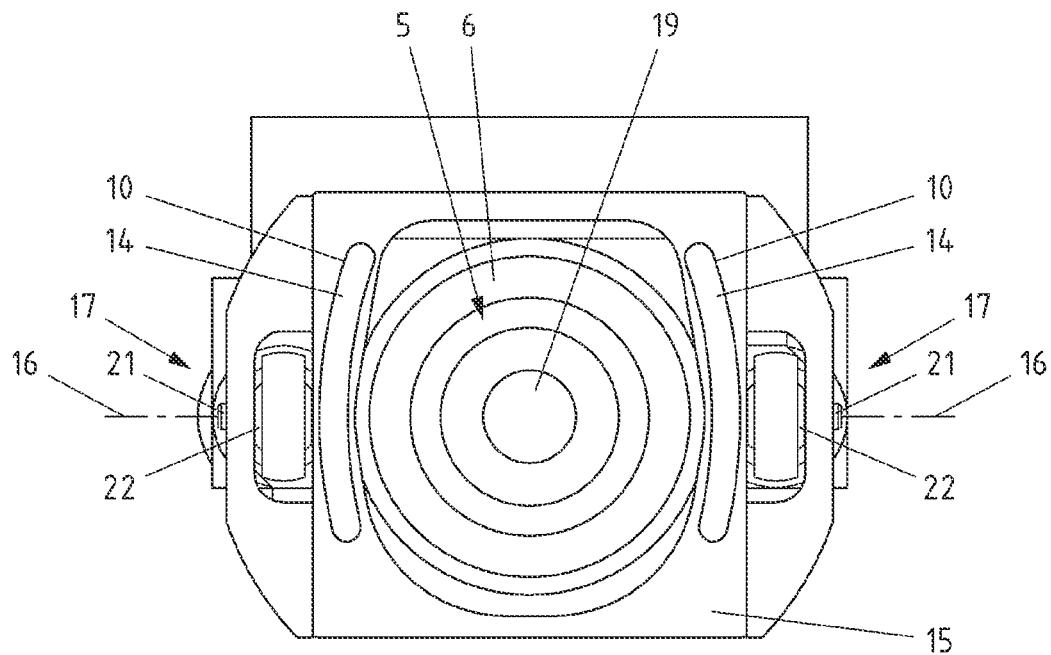

In FIG. 3, the sonotrode 5 together with the vibration damper 15 is shown in a top view from the sealing gap 4. The sonotrode 5 has a central receptacle 19 for receiving the part of the equipment element 2 that protrudes outwards relative the workpiece 3. This part of the equipment element 2 preferably comprises a screw cap 20. The sealing surface 6 of the sonotrode 5 is provided circumferentially around this receptacle 19. The sealing surface 6 of the illustrated and in this respect preferred sonotrode 5 is annular shaped. With the sealing surface 6, the sonotrode 5 presses against the workpiece 3 arranged above the flange 9, which is also annular shaped, in order to apply ultrasound to the joint and thus seal it, i.e. weld it. The vibration damper 15 is provided around the sonotrode 5 and the sealing surface 6 and at a distance from the sonotrode 5, wherein the vibration damper carries two clamping means 10, which are designed to correspond to the clamping means 11 associated with the anvil 7. The clamping means 10 associated with the sonotrode 5 are solid and are held by the more solid vibration damper 15. In the illustrated and thus preferred sealing device 1, the clamping means 10 associated with the sonotrode 5 and the vibration damper 15 are made of metal, in particular steel.

The vibration damper 15 is provided circumferentially to the sonotrode 5 and the sealing surface 6 and is held in corresponding recesses of the sealing device 1 via two pins 21. The pins 21 define a pivot axis 16 about which the vibration damper 15 can be pivoted relative to the recesses 22 at least substantially parallel to the sealing gap 4. The recesses 22 can be adjusted slightly forwards and backwards relative to the sealing surface 6 in the direction of the sealing gap 4. Since the recesses 22 and/or the vibration damper 15 are spring-loaded via spring means 17, the vibration damper 15 is adjusted relative to the sonotrode 5 and away from the anvil 7 against the restoring force of the spring means 17.

Figure 4A:
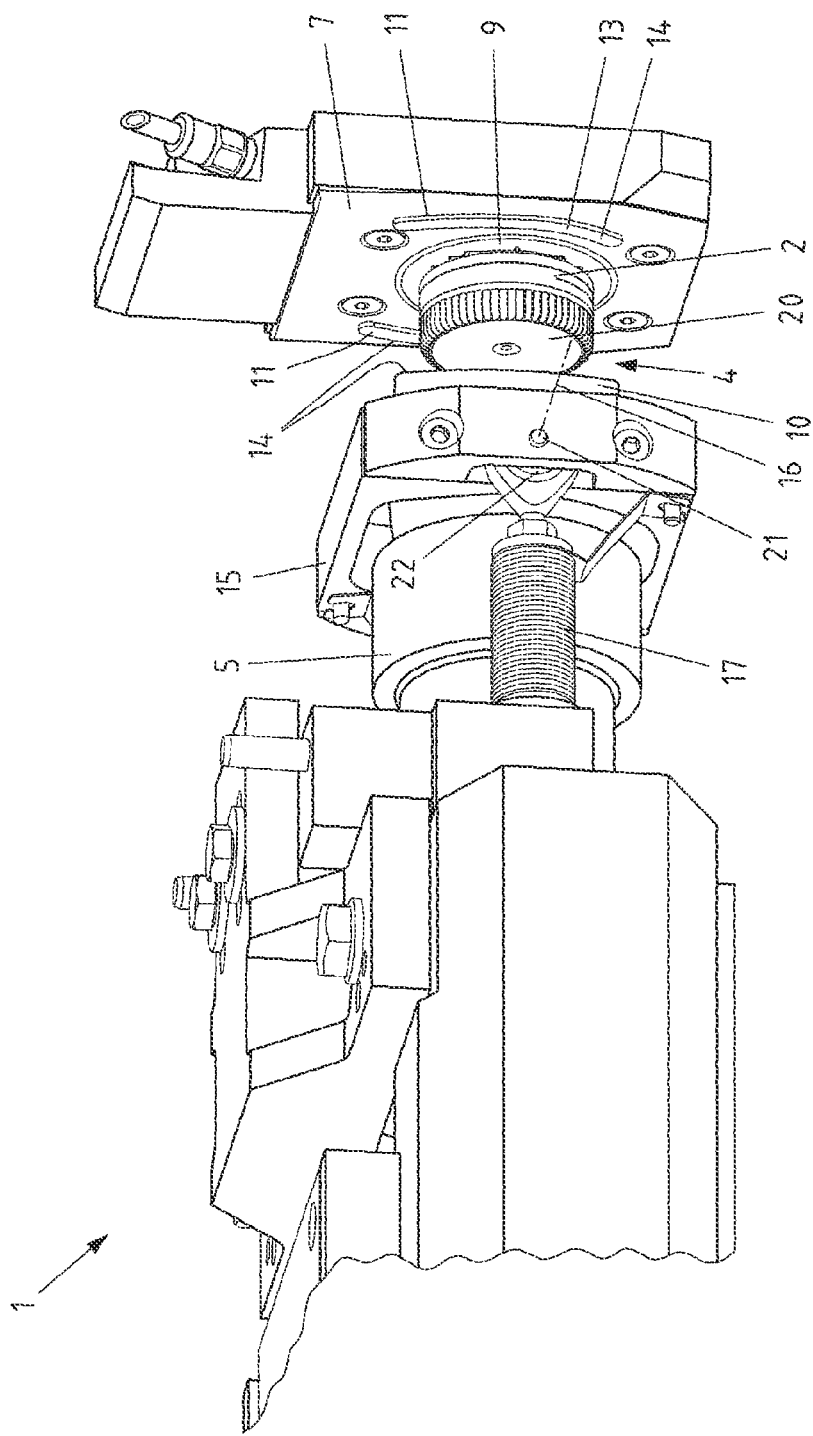
Figure 4B:
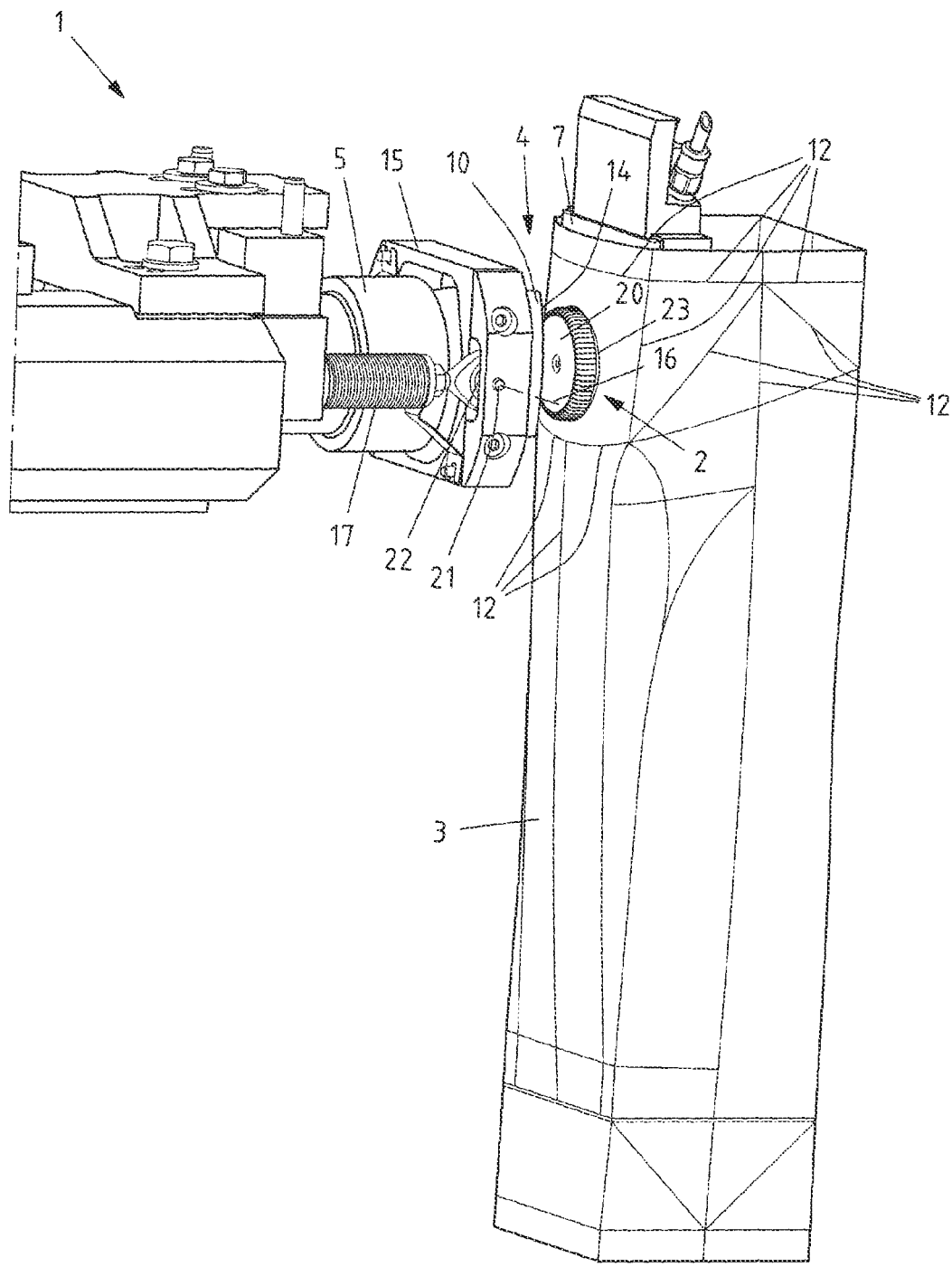
Figure 4C:
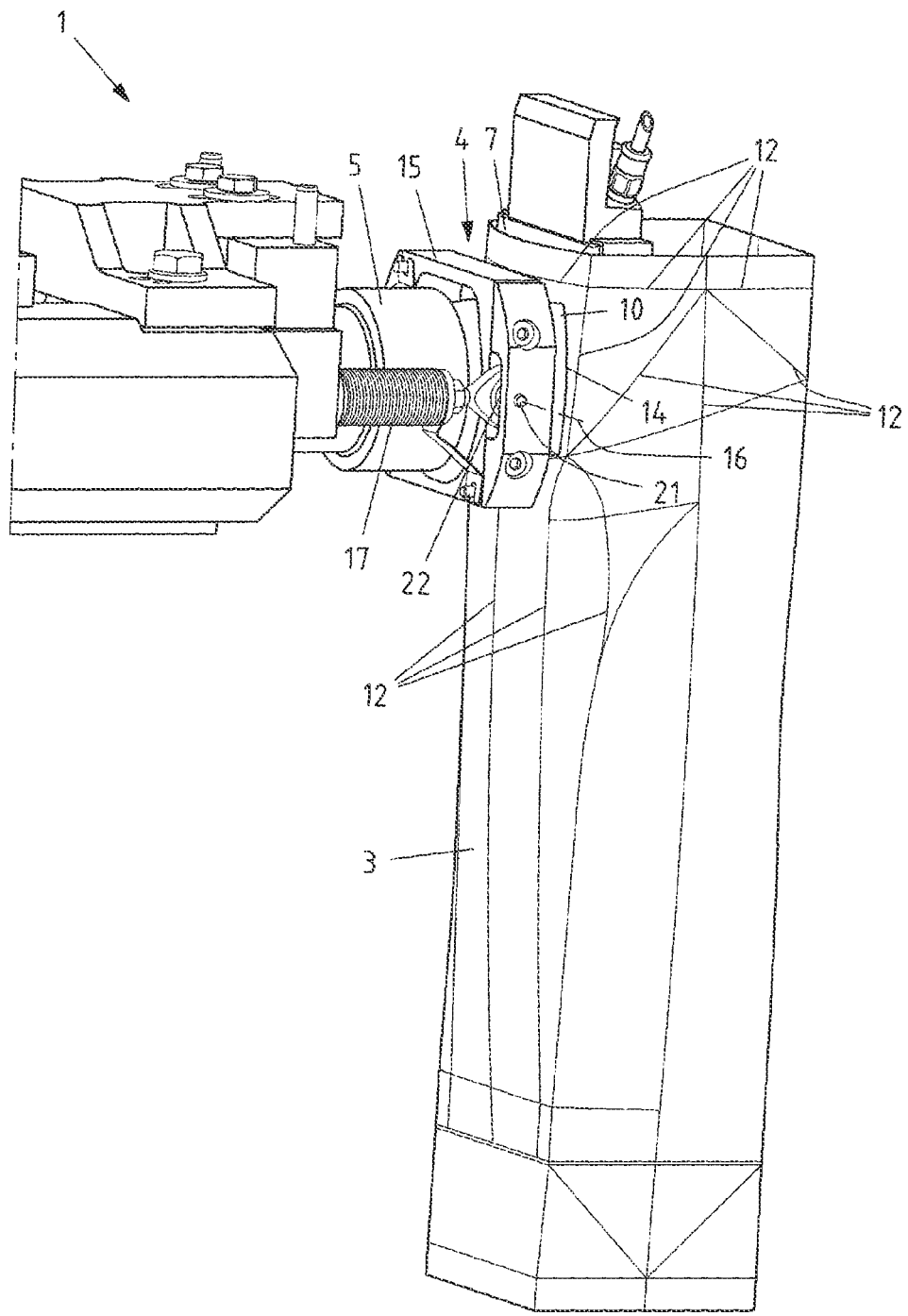

FIGS. 4A-C show different positions of the sealing device 1 while conducting the method for sealing. In FIG. 4A, the sealing device 1 with the sonotrode 5 and the anvil 7 is shown in an open position, in which an equipment element 2 can be inserted into the sealing gap 4 and inserted with the flange 9 into the corresponding receptacle 8. The equipment element 2 is held in the position shown by applying a vacuum to the receptacle 8.

Then, as shown in FIG. 4B, the workpiece 3 is inserted into the sealing gap 4 in such a way that the equipment element 2 protrudes through a corresponding hole 23 in the workpiece 3. However, the workpiece 3 could also be positioned accordingly first. The equipment element 2 could then be inserted into the sealing gap 4 and pushed through the corresponding hole 23 in the workpiece 3. The workpiece 3 then covers the flange 9 of the equipment element 2 circumferentially relative to the hole 23 in the workpiece 3.

Now the sonotrode 5 and/or the anvil 7 can be adjusted relative to each other into the closed position, as shown in FIG. 4C. In the closed position, the sonotrode 5 is activated and then transmits the ultrasound to the workpiece 3, which heats up together with the flange 9 of the equipment element 2 in the area of the flange 9 and thus forms a material bond between the workpiece 3 and the equipment element 2. At the same time, the workpiece 3 is clamped between the clamping means 10, 11, so that the ultrasound and the heat in the workpiece 3 with respect to the equipment element 2 can be transmitted to the outside beyond the clamping of the workpiece 3 between the clamping means 10, 11 to a limited extent, if at all. The crease lines 12 of the workpiece 3 in this area are therefore not excessively impaired by the sealing of the workpiece 3 and the equipment element 2. After sealing, the sonotrode 5 and the anvil 7 are adjusted back into the open position relative to each other. The workpiece 3 can then be removed from the sealing gap 4 with the equipment element 2 sealed on. The cycle is complete and can now be repeated in order to connect another workpiece 3 with an equipment element 2.

LIST OF REFERENCE SYMBOLS

1 Sealing device
2 Equipment element (spout)
3 Workpiece (packaging laminate)
4 Sealing gap
5 Sonotrode
6 Sealing surface
7 Anvil
8 Receptacle
9 Flange
10 Clamping means (sonotrode)
11 Clamping means (anvil)
12 Crease lines
13 Elastic section
14 Clamping surface
15 Vibration damper
16 Pivot axis
17 Spring means
18 Opening
19 Receptacle
20 Screw cap
21 Pin
22 Recess
23 Hole

The invention claimed is:

1. A sealing device for sealing equipment elements to workpieces in the form of a composite laminate, by means of ultrasound, with a sonotrode for generating an ultrasound, with a sealing surface for transmitting the ultrasound to the equipment element and/or the workpiece, with an anvil opposite the sonotrode and with an adjusting device for adjusting the sonotrode and the anvil relative to one another from an open position for at least partial inserting the equipment element and the workpiece into a sealing gap between the sonotrode and the anvil into a closed position for in each case at least partially pressing the workpiece and the equipment element between the sealing surface of the sonotrode and the anvil during ultrasonic sealing and back, wherein at least one pair of mutually corresponding clamping means, which are vibration-decoupled with respect to the sealing surface, are provided on opposite sides of the sealing gap for clamping the workpiece in the closed position, and in that the at least one pair of mutually corresponding clamping means are provided outside the sealing surface with respect to the equipment element, as viewed in a direction along the sealing gap, wherein the sonotrode is provided annularly around a receptacle, the receptacle being designed to receive at least a portion of the equipment element, and wherein the sonotrode defines the sealing surface such that the sealing surface is located annularly around the receptacle.

2. The sealing device according to claim 1, wherein the equipment element is a spout and/or the workpiece is a packaging laminate and the at least one pair of mutually corresponding clamping means is provided annularly around the sealing surface with respect to the sealing gap.

3. The sealing device according to claim 1, wherein at least two pairs of mutually corresponding clamping means, which are vibration-decoupled with respect to the sealing surface, are provided on opposite sides of the sealing gap for clamping the workpiece in the closed position, and wherein the at least two pairs of mutually corresponding clamping means are provided on opposite sides outside the sealing surface with respect to the equipment element and as viewed in a direction along the sealing gap.

4. The sealing device according to claim 1, wherein at least one clamping means of the at least one pair of mutually corresponding clamping means comprises an elastic section for vibration decoupling from the sonotrode.

5. The sealing device according to claim 1, wherein at least one pair of mutually corresponding clamping means is associated with the anvil and are designed as part of the anvil or spaced from the anvil in a direction at least substantially parallel to the sealing gap.

6. The sealing device according to claim 1, wherein at least one pair of mutually corresponding clamping means is associated with the sonotrode and are designed to be spaced apart from the sonotrode in a direction at least substantially parallel to the sealing gap.

7. The sealing device according to claim 1, wherein at least one clamping means is fixed to a vibration damper having a mass of between 50 g and 400 g and/or that the at least one clamping means is provided on a vibration damper provided at least substantially annularly around the sonotrode.

8. The sealing device according to claim 1, wherein at least one clamping means together with the vibration damper, is provided to be pivotable freely about at least one pivot axis, the at least one pivot axis being at least substantially parallel to the sealing gap with respect to the sonotrode and/or the anvil and/or that at least one clamping means, such that the at least one clamping means is spring-loaded at least substantially in the direction of the sealing gap.

9. A method for sealing equipment elements to workpieces by means of ultrasound wherein the equipment element and the workpiece are each at least partially inserted into a sealing gap between a sonotrode and an anvil and pressed there between the sonotrode and the anvil, wherein the pressed workpiece is clamped between at least one pair of mutually corresponding clamping means from opposite sides of the sealing gap with respect to the equipment element outside a sealing surface, and wherein, when the workpiece is clamped, a sealing surface of the sonotrode, is vibration-decoupled with respect to the at least one pair of mutually corresponding clamping means, transmits ultrasound to the pressed equipment element and/or the pressed workpiece, thereby sealing the equipment element and the workpiece together via the use of a sealing device according to claim 1.

10. The method according to claim 9, wherein spouts are used as equipment elements and packaging laminates are used as workpieces and wherein the workpiece is clamped by the mutually corresponding clamping means of the at least one pair of mutually corresponding clamping means in a longitudinal extension of the mutually corresponding clamping means at least predominantly transversely to a main fiber direction of the workpiece, and wherein the workpiece is clamped between the equipment element and a crease line of the workpiece.

11. The method according to claim 9, wherein the workpiece is clamped by the at least one pair of mutually corresponding clamping means on opposite sides of the equipment element.

12. The method according to claim 9, wherein at least one clamping means of the at least one pair of mutually corresponding clamping means absorbs the vibrations in an elastic section providing a clamping surface during sealing.

13. The method according to claim 9, wherein the vibrations transmitted from the sonotrode to at least one clamping means of the at least one pair of mutually corresponding clamping means are damped by a vibration damper supporting the clamping means and having a mass of between 50 g and 400 g, and/or wherein the vibrations transmitted from the sonotrode to the at least one clamping means of the at least one pair of mutually corresponding clamping means are damped by a vibration damper supporting the clamping means and extending at least substantially annularly around the sonotrode.

14. The method according to claim 9, wherein at least one clamping means of the at least one pair of mutually corresponding clamping means, together with the vibration damper, is pivoted for clamping about a pivot axis aligned at least substantially parallel to the sealing gap.

15. The method according to claim 9, wherein at least one clamping means of the at least one pair of mutually corresponding clamping means together with the vibration damper clamps the workpiece at least partially with a clamping force formed at least partially by a restoring force of at least one spring means.

16. The sealing device according to claim 4, wherein the elastic section provides the clamping surface of the clamping means for clamping the workpiece.

17. The sealing device according to claim 1, wherein at least one clamping means of the at least one pair of mutually corresponding clamping means is fixed to a vibration damper having a mass of between 80 g and 300 g and/or that the at least one clamping means of the at least one pair of mutually corresponding clamping means is provided on a vibration damper provided at least substantially annularly around the sonotrode.

18. The sealing device according to claim 1, wherein at least one clamping means of the at least one pair of mutually corresponding clamping means is fixed to a vibration damper having a mass of between 125 g and 225 g, and/or that the at least one clamping means of the at least one pair of mutually corresponding clamping means is provided on a vibration damper provided at least substantially annularly around the sonotrode.

19. The method according to claim 9, wherein the workpiece is clamped by the at least one pair of mutually corresponding clamping means at least substantially circumferentially around the equipment element.

20. The method according to claim 9, wherein the vibrations transmitted from the sonotrode to at least one of the clamping means of the at least one pair of mutually corresponding clamping means are damped by a vibration damper supporting the clamping means and having a mass of between 80 g and 300 g and/or wherein the vibrations transmitted from the sonotrode to at least one of the clamping means of the at least one pair of mutually corresponding clamping means are damped by a vibration damper supporting the clamping means and extending at least substantially annularly around the sonotrode.

* * * * *